United States Patent [19]

Brewer et al.

[11] 4,342,865
[45] Aug. 3, 1982

[54] HIGH TEMPERATURE BLEACHING METHOD FOR CELLULOSE ESTERS

[75] Inventors: Richard J. Brewer; Richard T. Bogan, both of Kingsport, Tenn.

[73] Assignee: Eastman Kodak Company, Rochester, N.Y.

[21] Appl. No.: 286,919

[22] Filed: Jul. 27, 1981

Related U.S. Application Data

[63] Continuation-in-part of Ser. No. 182,904, Sep. 2, 1980, abandoned.

[51] Int. Cl.$^3$ .............................................. C08C 18/30
[52] U.S. Cl. .......................................... 536/76; 8/107; 8/110; 8/111
[58] Field of Search .......................... 8/110, 111, 107; 536/76

Primary Examiner—A. Lionel Clingman
Attorney, Agent, or Firm—Malcolm G. Dunn; Daniel B. Reece, III

[57] ABSTRACT

Improved method for bleaching cellulose esters, such as cellulose acetate, cellulose acetate propionate and cellulose acetate butyrate, by adding during the hydrolysis reaction of the cellulose ester at from 80° C. to 150° C. a bleaching agent mixture of hydrogen peroxide and at least one monopersulfate salt selected from the group consisting of sodium, potassium and lithium or mixtures thereof.

3 Claims, No Drawings

HIGH TEMPERATURE BLEACHING METHOD FOR CELLULOSE ESTERS

This is a continuation in part of application Ser. No. 182,904 filed Sept. 2, 1980 now abandoned.

FIELD OF THE INVENTION

Our invention is directed to an improved high temperature method for reducing the solution color of or bleaching cellulose esters such as cellulose acetate, cellulose acetate propionate and cellulose acetate butyrate.

BACKGROUND OF THE INVENTION

The use of various bleaching agents to remove color of cellulose, both during refining and purification, and also of cellulose esters is well known in the art. For instance, sodium hypochlorite, oxygen and free chlorine are well-known color reducing or bleaching agents for cellulose, especially cellulose derived from wood sources. Potassium permanganate ($KMnO_4$) or hydrogen peroxide ($H_2O_2$) has been used as a bleaching agent for cellulose esters prepared by normal acetylation and hydrolysis procedures. Potassium permanganate, although being an effective bleaching agent for cellulose esters, poses certain environmental pollution problems and the resulting liberated manganese must be recovered and disposed of. The use of either hydrogen peroxide or persulfate as a bleaching agent requires larger than desired quantities to be effective and thus is not normally used commercially.

The use of higher than normal temperatures, normal temperature being from about 40° C. to about 50° C., for acetylation and hydrolysis of cellulose esters provides a more uniform, higher quality product from lower quality, less expensive cellulose raw materials. However, the higher process temperatures, from about 80° C. to about 150° C., impart substantial color to the cellulose ester and require an effective bleaching agent to obtain acceptably low color ester. Hydrogen peroxide or persulfates used alone are not satisfactory bleaching agents in the higher than normal temperature process, i.e. from about 80° C. to about 150° C., owing to the large amount of bleaching agent required and its deleterious effect on cellulose ester molecular weight, i.e. high concentrations greater than 0.5% of either hydrogen peroxide or persulfate will undesirably reduce the molecular weight, thereby causing a loss of physical properties such as strength and toughness; e.g., in a molded plastic or extruded fiber. However, we have discovered that the use of a combination of hydrogen peroxide and persulfate as a bleaching agent for cellulose acetate is unexpectedly effective at low concentrations, i.e. about 0.2 to about 0.4 pphr (parts per hundred parts resin), for removing color without concurrent loss of polymer molecular weight.

DISCLOSURE OF THE INVENTION

In accordance with the present invention, we therefore provide an improved high temperature method for bleaching cellulose esters such as cellulose acetate, cellulose acetate propionate and cellulose acetate butyrate, by adding at a temperature of about 80° C. to about 150° C. to the hydrolysis solution during the hydrolysis reaction of the cellulose ester a bleaching agent involving a mixture of about 0.1 to 0.3 pphr of at least one monopersulfate salt and ~0.1 to ~0.3 pphr hydrogen peroxide in an aqueous solution, the monopersulfate salt being selected from the group consisting of sodium, potassium and lithium or mixtures thereof.

The bleaching agent mixture is preferably added at a temperature of about 100° C. to about 105° C. about 0.5 to about 1.0 hour prior to completion of the hydrolysis reaction.

The bleaching agent may preferably involve a mixture of about 0.1 to about 0.2 pphr hydrogen peroxide and about 0.2 to about 0.3 pphr of at least one monopersulfate salt.

Best Mode for Carrying Out The Invention

In the practice of the invention, cellulose is conventionally in a well-known manner [see pages 118–143 of the Kirk-Othmer "Encyclopedia of Chemical Technology", 1979 copyright, Third Edition, Volume 5; John Wiley & Sons; for a description of acetylation, hydrolysis, precipitation, washing, stabilization and drying procedures] esterified in the presence of a suitable catalyst, such as sulfuric acid, with an aliphatic anhydride in an aliphatic acid solvent at a temperature of about 40° C. to about 95° C. until a clear esterification solution is obtained. Then an aqueous acetic acid solution comprising about 60% to about 75% acid and about 40% to about 25% water is added at a predetermined rate at a temperature of about 80° C. to about 110° C. to react with the anhydride and to thereby provide about 10% to about 20% free water to form a hydrolysis solution. At a temperature of about 90° C. to about 105° C. the acid catalyst is neutralized, as with sodium acetate, for instance, and the hydrolysis reaction is then carried out for a period of from about 3 to about 10 hours at a temperature of from about 80° C. to about 150° C.

The bleaching agent, which may comprise a mixture of about 0.1 to about 0.3 pphr hydrogen peroxide and about 0.1 to about 0.3 pphr of at least one monopersulfate salt in an aqueous solution, the monopersulfate salt being selected from the group consisting of sodium, potassium and lithium or mixtures thereof, is added to the hydrolysis solution during the hydrolysis reaction of the cellulose ester at about 80° C. to about 150° C. Preferably the bleaching agent may comprise a mixture of about 0.1 to about 0.2 pphr hydrogen peroxide and about 0.2 to about 0.3 pphr of at least one monopersulfate salt.

The bleaching agent mixture is preferably added about 0.5 to about 1.0 hour prior to the end of the hydrolysis reaction time (which is normally about 3 to about 10 hours) during the high temperature hydrolysis process; that is, at a temperature of preferably about 100° C. to about 105° C. The reason for this is that if added too early the bleaching agent mixture will be consumed and color will reappear during the latter states of the hydrolysis reaction.

After the hydrolysis reaction is completed, the bleached cellulose ester is precipitated, washed, stabilized and dried in a well-known manner.

The following table illustrates the use of varying mixtures of hydrogen peroxide/various monopersulfate salts as bleaching agents for cellulose acetate, cellulose acetate propionate and cellulose acetate butyrate.

TABLE I

Bleaching Cellulose Esters with Monopersulfate Salt/Hydrogen Peroxide Mixtures

| Example | Cellulose Ester Type | Monopersulfate Salt Type | Monopersulfate/$H_2O_2$[a] pphr/pphr | Solution Color, ppm[b] MeCl$_2$/MeOH, 9/1[c] | Acetone |
|---|---|---|---|---|---|
| 1 | CA[d] | Potassium | 0.1/0.2 | 350 | 325 |
| 2 | CA | Potassium | 0.1/0.3 | 375,325 | 400,375 |
| 3 | CA | Potassium | 0.2/0.2 | 375 | 400 |
| 4 | CA | Potassium | 0.3/0.0 | 700 | — |
| 5 | CA | Sodium | 0.1/0.2 | 350 | 375 |
| 6 | CA | Sodium | 0.2/0.2 | 375 | 375 |
| 7 | CA | Sodium | 0.3/0.0 | 750 | 700 |
| 8 | CA | Lithium | 0.1/0.3 | 325 | 350 |
| 9 | CAP[e] | Potassium | 0.1/0.2 | 275 | 300 |
| 10 | CAB[f] | Potassium | 0.1/0.2 | 300 | 275 |
| 11 | CA | None | 0.0/0.3 | 575 | — |
| 12 | CA | None | 0.0/0.5 | 525 | 525 |
| 13 | CA | None | 0.0/1.0 | 500 | 400 |
| 14 | CA | None | 0.0/0.0 | 650,700 | 750,800 |

[a]Based on weight of cellulose ester. Bleaching agent added 0.5 to 1.0 hour prior to end of hydrolysis reaction at 100°–105° C.
[b]Determined on 20 weight percent solutions of the esters dissolved in the designated solvent.
[c]MeCl$_2$/MeOH, 9/1 = methylene chloride/methanol, 9/1 w/w
[d]CA = cellulose acetate
[e]CAP = cellulose acetate propionate
[f]CAB = cellulose acetate butyrate

Determination of Solution Color of Cellulose Esters

The solution color of cellulose esters is determined by dissolving 20 weight percent of the ester in the appropriate solvent (methylene chloride/methanol, 9/1, w/w or acetone) and comparing the solution to known standards.

The invention has been described in detail with particular reference to preferred embodiments thereof, but it will be understood that variations and modifications can be effected within the spirit and scope of the invention.

We claim:

1. Improved high temperature method for bleaching cellulose esters consisting of cellulose acetate, cellulose acetate propionate and cellulose acetate butyrate, said method comprising:
adding at a temperature of about 80° C. to about 150° C. to the hydrolysis solution during the hydrolysis reaction of the cellulose ester a bleaching agent comprising a mixture of about 0.1 to about 0.3 pphr (parts per hundred parts resin) hydrogen peroxide and about 0.1 to about 0.3 pphr of at least one monopersulfate salt in an aqueous solution, said monopersulfate salt being selected from the group consisting of sodium, potassium and lithium or mixtures thereof.

2. Improved method as defined in claim 1 wherein said bleaching agent is added at a temperature of about 100° C. to about 105° C. about 0.5 to about 1.0 hour prior to completion of the hydrolysis reaction.

3. Improved method as defined in claim 1 wherein the bleaching agent added to the hydrolysis solution comprises a mixture of about 0.1 to about 0.2 pphr of said hydrogen peroxide and about 0.2 to about 0.3 pphr of said monopersulfate salt.

* * * * *